United States Patent
Chiueh et al.

(10) Patent No.: US 7,113,970 B2
(45) Date of Patent: Sep. 26, 2006

(54) COMPLEX-VALUED MULTIPLIER-AND-ACCUMULATOR

(75) Inventors: Tzi-Dar Chiueh, Taipei (TW); Yuan-Hao Huang, Hsinchu (TW)

(73) Assignee: National Science Council, Taipei (TW)

( * ) Notice: Subject to any disclaimer, the term of this patent is extended or adjusted under 35 U.S.C. 154(b) by 636 days.

(21) Appl. No.: 09/908,588

(22) Filed: Jul. 20, 2001

(65) Prior Publication Data

US 2002/0161813 A1    Oct. 31, 2002

(30) Foreign Application Priority Data

Mar. 6, 2001   (TW) .............................. 90105369 A

(51) Int. Cl.
*G06F 7/52* (2006.01)
(52) U.S. Cl. .................................... 708/622
(58) Field of Classification Search ............... 708/523, 708/520, 524, 501, 511, 603, 607, 622
See application file for complete search history.

(56) References Cited

U.S. PATENT DOCUMENTS

| | | | |
|---|---|---|---|
| 5,912,828 A * | 6/1999 | Mondal et al. ............. | 708/323 |
| 6,549,561 B1 * | 4/2003 | Crawford .................... | 375/137 |
| 6,618,431 B1 * | 9/2003 | Lee ............................. | 375/147 |
| 2002/0010728 A1 * | 1/2002 | Stoye ......................... | 708/319 |
| 2003/0046323 A1 * | 3/2003 | Orchard ..................... | 708/520 |

\* cited by examiner

*Primary Examiner*—Chuong D Ngo
(74) *Attorney, Agent, or Firm*—Johnson, Lin & Associates; Chauncey B. Johnson, Esq.

(57) ABSTRACT

The multi-mode Multiplier-And-Accumulator of the present invention is used with the double-precision Complex-Valued Multiplier-And Accumulator as a main configuration, and the different precisions and digital modes make it more flexible, compared to the traditional real number Multiplier-And-Accumulator. In addition, it does not have a data alignment problem which occurs in the traditional application of different precision Subword Parallel processors. This kind of Multiplier-And-Accumulator takes a double-precision Complex-Valued Multiplier-And- Accumulator as the main configuration, with four double-precision real-valued multipliers and several groups of accumulators to assist in different modes ofoperation. Each double-precision real-valued multiplier can be segmented into four single-precision multipliers, and then double-precision multiplier products are obtained by means of displacement addition. If two real numbers which are continuous in time sequence are taken as the real number input and imaginary number input for the original complex-valued multipliers, the accumulated products include not only the present output accumulated product summation but also the output accumulated product summation of the previous time and the next time.

15 Claims, 8 Drawing Sheets

| Mode | N x N Complex MAC | N x N Real MAC | N/2 x N/2 Complex MAC | N/2 x N/2 Real MAC |
|---|---|---|---|---|
| cycles per MAC iteration | K | K/4 | K/4 | K/16 |

Performance for an K-order FIR filter

Figure 7

COMPLEX-VALUED MULTIPLIER-AND-ACCUMULATOR

FIELD OF THE INVENTION

This Multiplier-And-Accumulator can perform double-(single-) precision complex (real) number operations suitable for multiplication-addition for all types of digital signals, including finite impulse response filter operation, infinite impulse response filter operation, match filter operation, correlation coefficient operation, convolutional operation, transformation between time and frequency signal, etc., or for digital communication systems, a digital equalizer or a complex number filter, as examples.

BACKGROUND OF THE INVENTION

The Multiplier-And-Accumulator is the core processing unit in digital signal processors. In the application of programmable digital signal processors, such as in video, audio, voice, and telecommunication, we often use a finite impulse response filter, an infinite impulse response filter, a match filter, correlation coefficient operation, convolutional operation, transformation between time field and frequency field, etc. Therefore, it becomes a significant part of digital signal processors in order to perform high-dimensional vector product accumulation at high speed.

There are three methods of accelerating a Multiply-And-Accumulate operation. The first is to optimize Multiply-And-Accumulate arithmetic; this method reduces the delay time and speeds up operation with different Booth Multiplier architecture. The second way involves the auxiliary function of digital signal processors. In the program sequence control unit, multiplication-and-accumulation are often executed with a looping counter, in order to avoid overhead looping operations needed for detecting data ending conditions, so that the digital signal processor can perform the multiplication-addition at full speed. Besides, because the two vectors to be multiplied and accumulated are often different from each other in length, such as in a finite impulse response filter, match filter, and so on, the coefficient vector will be read in a cyclic way. Thus, digital signal processors usually provide cyclic addressing to accelerate the accessing of the cyclic data. Both of the above techniques are traditional ones for accelerating multiplication-addition, maximizing the Multiplier-And-Accumulator efficiency through elimination or reduction of the extra operations in hardware or software.

The third method is to execute the MAC operations in the parallel Multiplier-And-Accumulator configuration. The MAC operations are accelerated by means of parallel-operating Multiplier-And-Accumulators, using Single Instruction Multiple Data (SIMD) as its processor architecture. However, it has a higher hardware cost, and in operations of different precision, the time required for the operation is the same, so that the hardware is optimally efficient. Therefore, the so-called subword parallel digital signal processor is derived. Because different applications require different signal precision, a high-precision operation can be segmented into several low-precision operations, and thus parallel operations can be performed. Usually, most of these kinds of design are for simple addition, subtraction, and logic operations. In recent years, the subword parallel configuration has been adopted in the Multiplier-And-Accumulator to accelerate multiply-and-accumulation. This design can increase operation speed, but data accuracy is lowered. Several low-precision data are read at one time, and thus additional hardware or software is required for data alignment. Options to solve this problem are to add groups of alternate buffer storage, or to add a fault bit indicator for alignment, and then to upload it into the buffer storage for operation. In this case, each group of inputs needs extra data alignment processing.

In summary, Multiplier-And-Accumulator configurations with Subword Parallel operation can effectively step up data signal processing efficiency in multiplication-addition, but the data alignment requires extra processing for the different precision data.

SUMMARY OF THE INVENTION

The present invention demonstrates a wholly improved Multiplier-And-Accumulator configuration which is more flexible in performing multiplication-addition, especially for complex number multiplication-and-accumulation in communication signal processing.

Another advantage of the present invention is in Subword Parallel operation. When a single-precision value operation is in process, support can be drawn in a parallel manner, using double-precision hardware, to get accelerated multiplication-accumulation.

Furthermore, a Complex-Valued Multiplier-And-Accumulator can solve the data alignment problem occurring in general Subword Parallel arithmetic units, and thus extra hardware and software operations are omitted.

While the invention is susceptible to various modifications and alternative forms, certain illustrative embodiments thereof have been shown by way of example in the drawings and will herein be described in detail.

BRIEF DESCRIPTION OF THE DRAWINGS

The invention will now be described by way of example with reference to the accompanying Tables and Figures in which.

Figure 5:
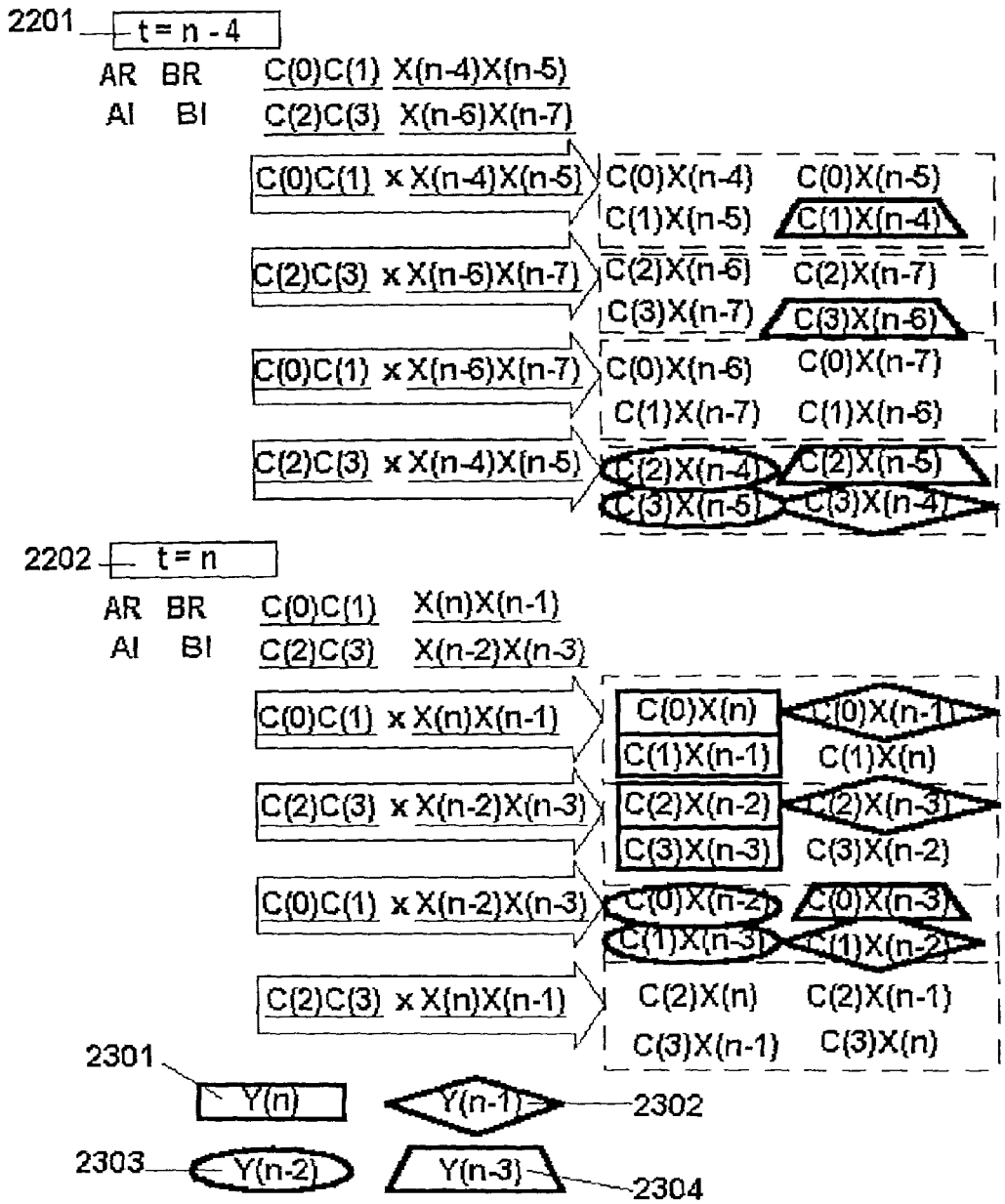
Figure 6:
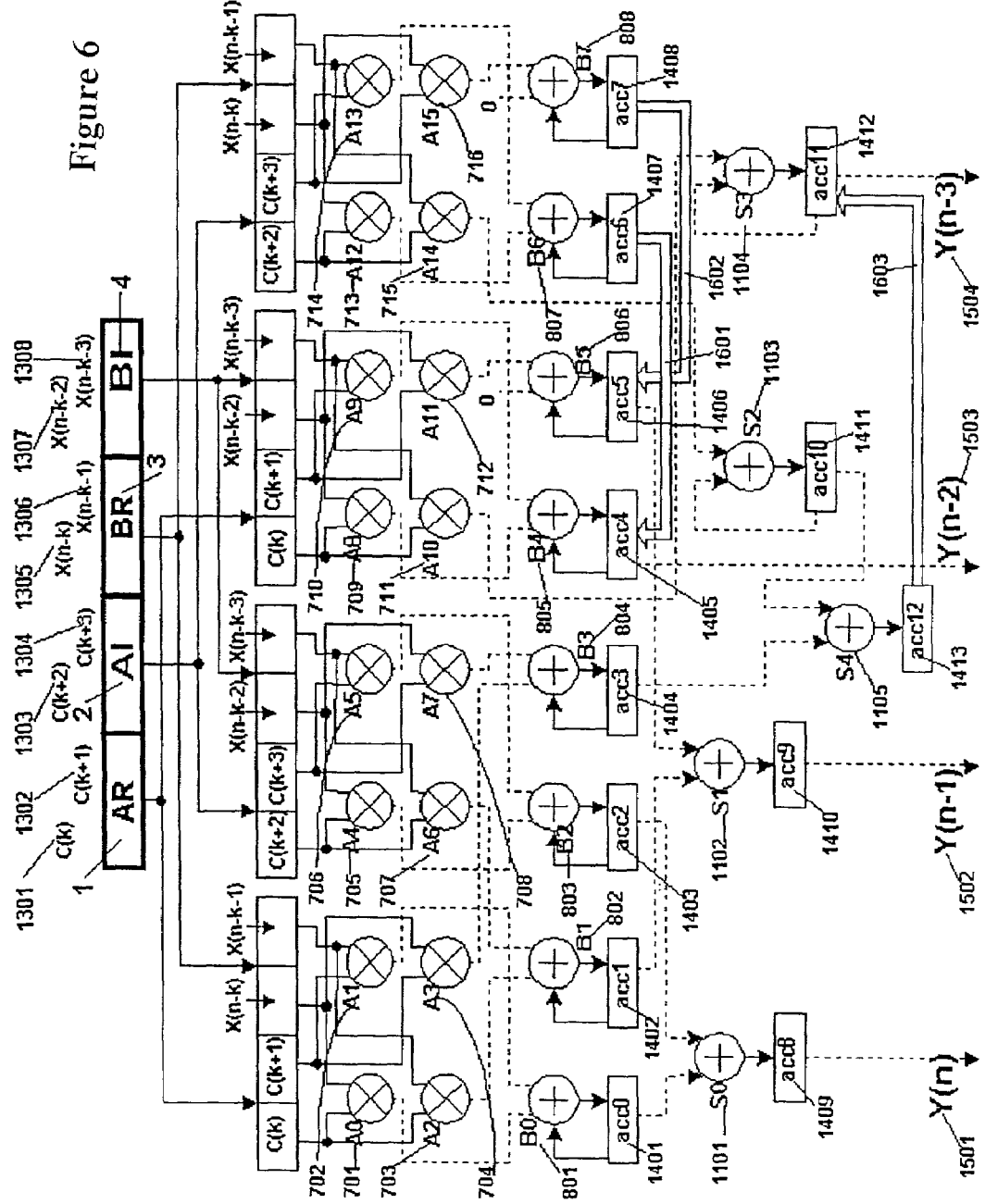

single-precision, Complex-Valued Multiplier-And-Accumulator configuration;

FIG. 5 is a diagram of an $$\frac{N}{2} \times \frac{N}{2}$$

single-precision, real-valued Multiplier-And-Accumulator for a K-tap finite impulse response filter operation program;

FIG. 6 is a diagram of an $$\frac{N}{2} \times \frac{N}{2}$$

single-precision, real-valued Multiplier-And-Accumulator configuration; and

FIG. 7 is a summary of different-mode efficiency in the Complex-Valued Multiplier-And-Accumulator.

DETAILED DESCRIPTION

The present invention demonstrates a new configuration, suitable for different data formats, including multiplication-and-accumulations of complex/real-valued and single-/double-precision data. In addition, the alignment processing in the general single-precision operation can be avoided. This configuration has several embodiments in different modes.

To achieve the above goal, the invention adopts the double precision complex valued Multiplier-And-Accumulator as the main configuration. FIG. 1(*a*) shows four double-precision Multiplier, such as C0 double-precision multiplier (500), C1 double-precision multiplier (501), C2 double-precision multiplier (502) and C3 double-precision multiplier (503) respectively; and three accumulators such M1 Accumulator (401), M2 Accumulator (402) and M3 Accumulator (403).

Each of the four double precision multipliers can be segmented into four Subword Parallel single precision multipliers, which is shown in FIG. 1(*b*). Each of the Subword Parallel single-precision multipliers, three left shifters, and a wallet tree adder (533). The four single precision multipliers are, for example, the SM0 single-precision multiplier (520), the SM1 single-precision multiplier (521), the SM2 single precision multiplier (522), and the SM3 single-precision multiplier (523). The three left-shifters are left-shift-$\frac{N}{2}$-bit shifter (530), SH1 left-shift-$\frac{N}{2}$-bit shifter (531), left-shift-N-bit shifter (532).

A double-precision multiplication product is derived from the products pp0, pp1, pp2, pp3 by using the left-shift-and-add method. The product pp0, shifted-$\frac{N}{2}$-bit pp1, shifted-$\frac{N}{2}$-bit pp2, and shifted-N-bit pp3 are summed to form the 2N-bit product of double-precision multiplication.

Figure 4:
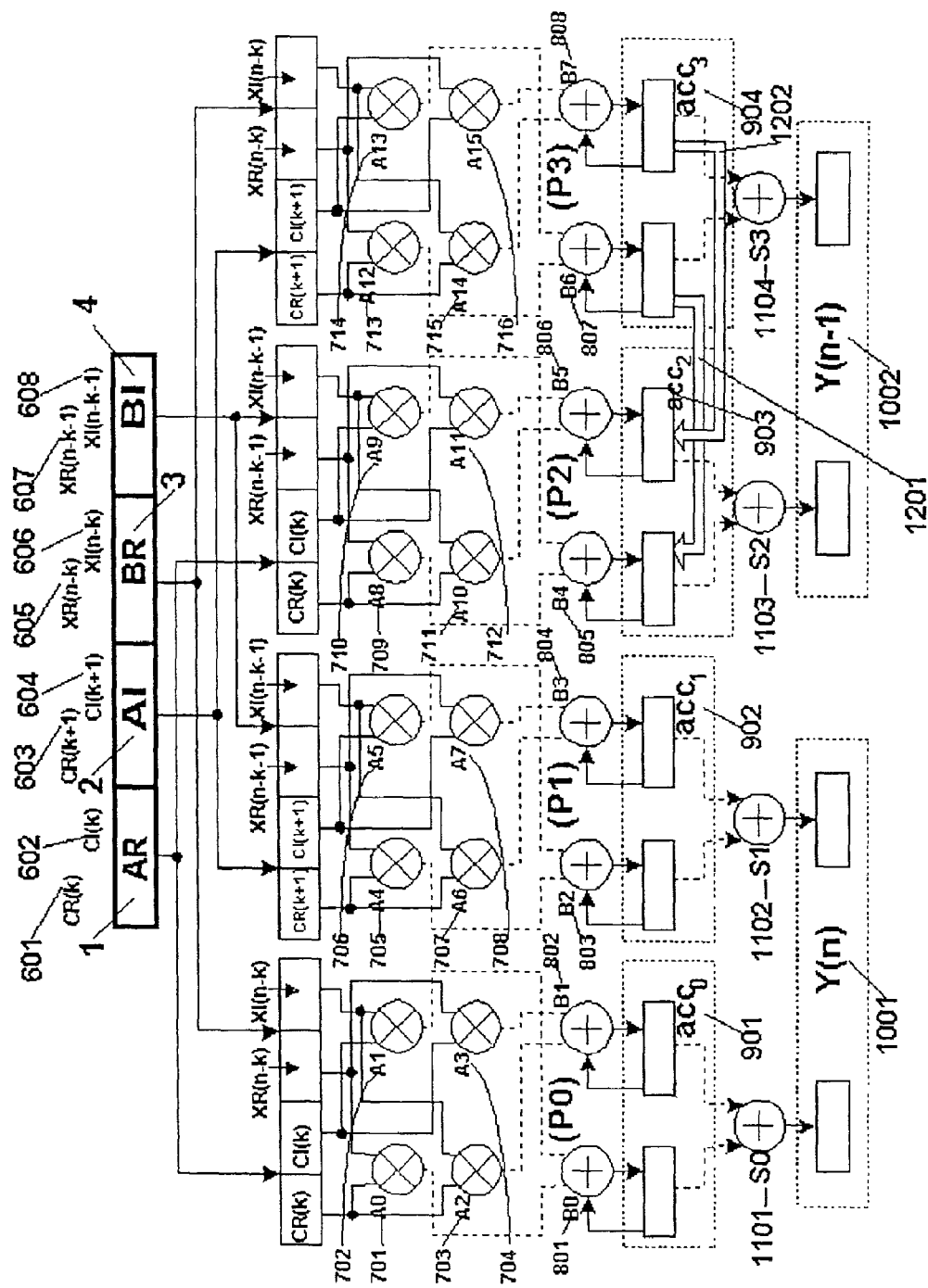
FIG. 4 illustrates an $$\frac{N}{2} \times \frac{N}{2}$$

If all of the products pp0, pp1, pp2, and pp3 are configured with a group of complex accumulators, a group of single-precision complex-valued multiplier-and-accumulators is formed, as is shown in FIG. 4. In this way, four parallel single-precision complex-valued multiplication-and-accumulations can be performed.

The differences between this new type of complex-valued multiplier-and-accumulator configuration and those of existing patents or known products are as follows.

(1) The invention can be widely used in complex-valued multiplication-accumulation operations in communication systems, as well as in the real-valued operation when processing general digital signals. On the other hand, those of existing patents are either for complex number operation or for real number operation only.

(2) The invention can perform both high- and low-precision multiplication-accumulation. Furthermore, the hardware can be fairly effectively used in the latter. Comparatively, the existing complex-valued multiplier or real-valued multiplier cannot sufficiently make use of all hardware when performing subword parallel operations.

(3) When performing a low-precision operation with the invention, data alignment is not necessary, whereas it has to be done in general subword Parallel operations. In parallel operations, each multiplication-accumulation operation brings three accumulated products for three successive iterations. They are for the present iteration, the previous iteration and the next iteration. Thus, in the parallel operation, operations for data alignment can be avoided.

Through proper multiplexing, the operational unit of the invention can be applied in double (single)-precision complex (real)-valued multiplication-accumulations, and thus it is more flexible.

If there are four successive pairs of real-valued inputs into the four single-precision complex-valued multiplier-and-accumulators whose real numbers and imaginary numbers are as shown in FIG. 4, through simple multiplexing and data movement, sixteen single-precision real-valued multiplication-additions can be performed in parallel in one cycle.

Each group of inputs to the multiplier-and-accumulator is related to another, and through the operation results, we can verify that, in each operation, not only the present accumulated product but also the accumulated products for the previous iteration time and the next iteration time are computed. Therefore, before each multiplication-accumulation iteration, the accumulated value of the next output should be moved to the accumulators where the previous accumulated value is stored.

In this way, the invention can simply perform sub-word parallel multiplication-and-accumulation without data-misaligned operation. This is due to the fact that the accumulated product is already obtained in the data-aligned computation. This is the reason that the extra processing for data alignment, necessary in general Subword Parallel operation units, can be omitted in this kind of complex-valued multiplier-and-accumulator.

N×N Double-Precision Complex-Valued Multiplier-And-Accumulator

The double-precision complex-valued multiplier is the main configuration, as shown in FIG. 1(*a*). AR and BR are real number registers 1 and 3, respectively, and AI and BI are imaginary number registers (2) and (4), respectively. ACCR is real number accumulation register (201). ACC-AUX is auxiliary accumulation register (202). ACCI is imaginary number accumulation register (203).

In this architecture, there are four double-precision real number multipliers for calculating the products of AR real number (1) times BR real number (3), AI imaginary number (2) times BI imaginary number (4), AR real number(1) times BI imaginary number (3), as well as AI imaginary number (2) times BR real number (4). The products are accumulated in ACCR real number accumulation register (201), and ACCI Imaginary numbers accumulation register (203). At this time, the multiplexer MUXI selects the P2 product (103), and the basic complex accumulator output is formed.

$$Y(n) = \sum_{k=0}^{k-1} C(k) \cdot X(n-k)$$

N×N Double-Precision Real-Valued Multiplier-And-Accumulator

Figure 1A:
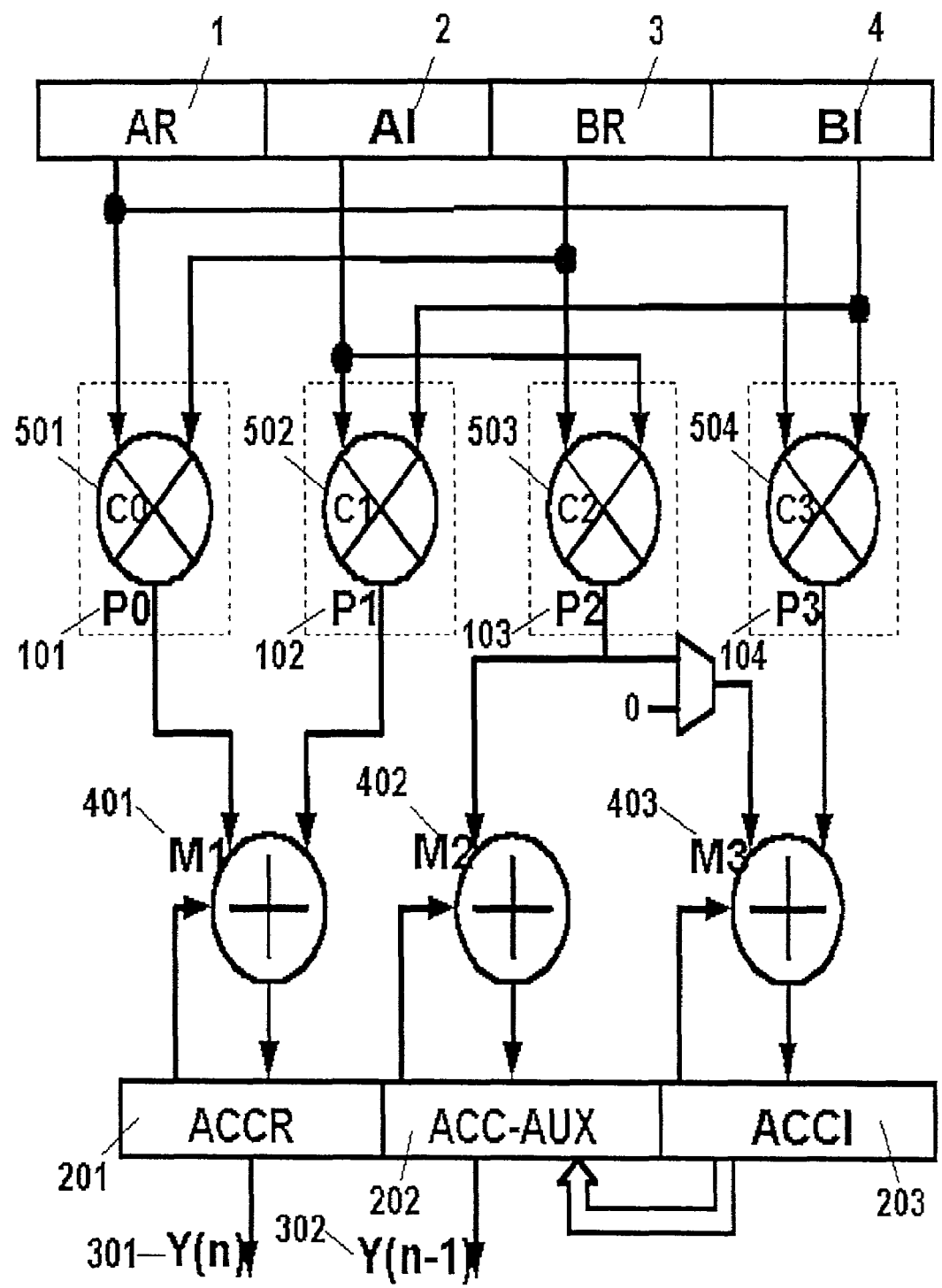
FIG. 1(a) is a diagram of an N×N double-precision complex-(real-)valued Multiplier-And-Accumulator Configuration.
Figure 1B:
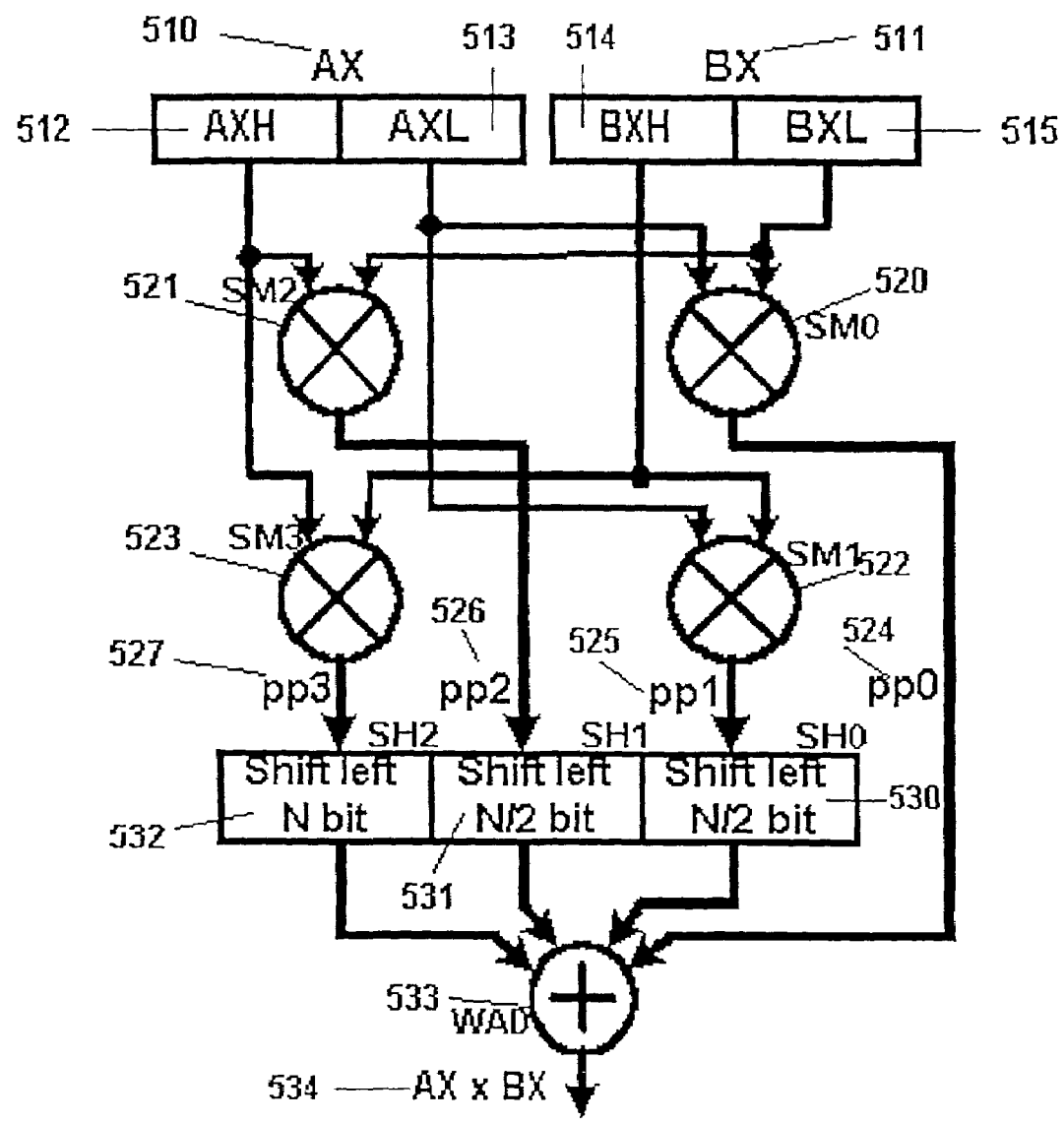
FIG. 1(b) is a diagram of an N×N double-precision multiplier segmented as a secondary number group into four single-precision multipliers.
Figure 2:
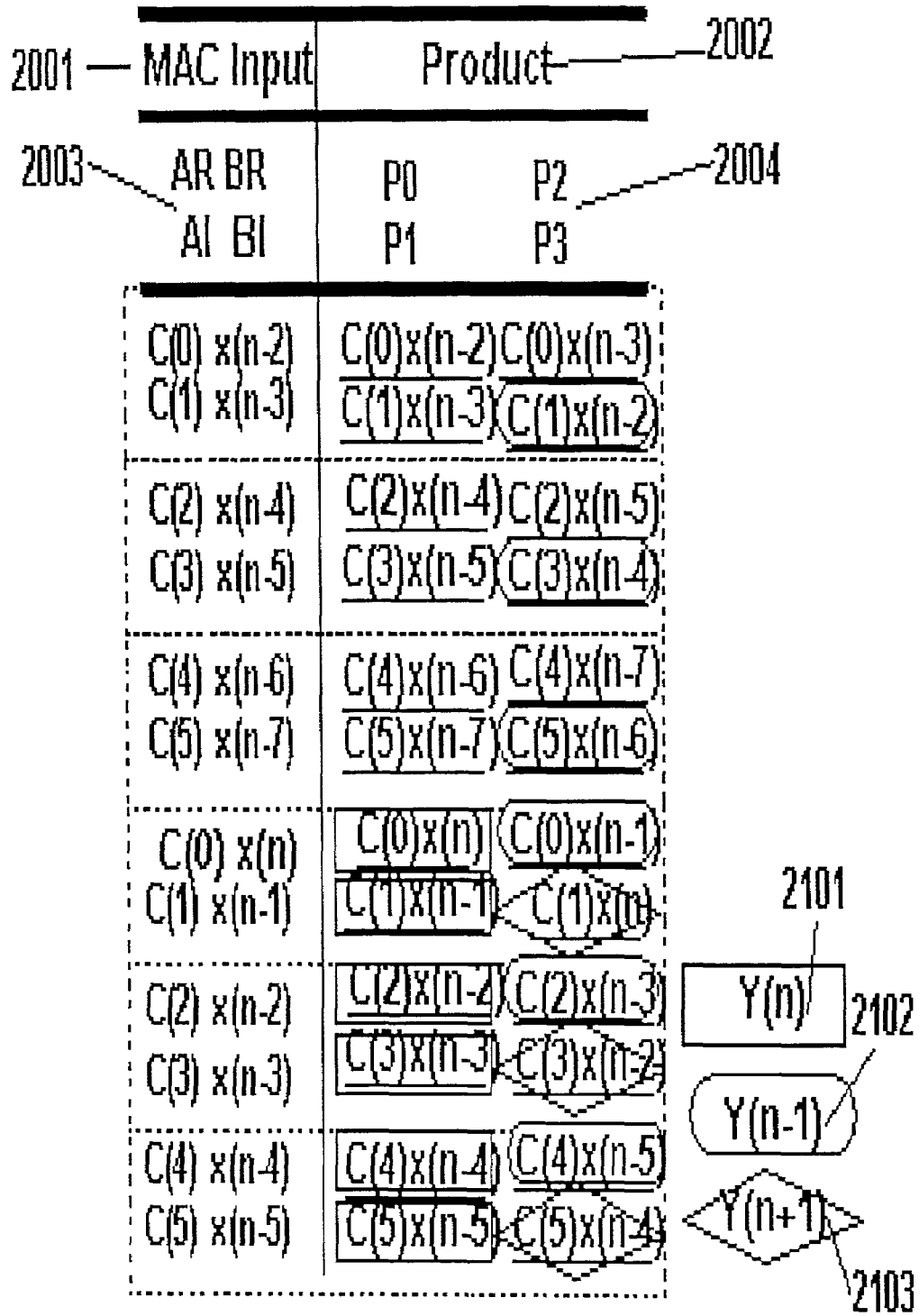
FIG. 2 is a diagram of an N×N double-precision real number multiplier for a K-tap finite impulse response filter operation program.

Double-precision real-valued multiplication-accumulation can also be carried out by the N×N double-precision complex-valued multiplier-and-accumulator indicated in FIG. 1(b). Take the K-tap finite impulse response filter in FIG. 2 as an example.

In the above equation, C(k) is the filter coefficient, X(n−k) is the input signal and Y (n) is the output signal. In each complex-valued multiplication-and-accumulation operation, two pairs of continuous real-valued samples C(k) C (k+1) and X(n−k) X(n−k−1) can be input, and in each cycle of multiplication-and-addition, only the operation with data aligned with even-numbered index value to even-numbered index value is necessary. When K=6 in FIG. 2, the previous third operation results in the output Y(n−2) accumulated product, while the next third operation results in output Y (n) accumulated product, so that the output Y can be obtained in each K/2 times of operation, and half of the accumulated product which is necessary for the previous output Y (n−1), as well as half of the accumulated product which is necessary for the next output Y (n+1), can be obtained in each operation. Thus, when performing double-precision real-valued operation, the multiplexer MUXI in FIG. 1(a) is set to 0, and before each cycle of multiplication-addition, the next output accumulated summation, e.g. ACCI (203) in FIG. 1(a), is moved to the previous output accumulation register, e.g. ACC-AUX(202) in FIG. 1(a). Thus, in the iteration n, the output value of Y (n) (301) and Y (n−1) (302) can be obtained. For this reason, the unaligned data operation between even numbered index values and odd numbered index values can be omitted. Thus, on average, in each time period, four double-precision real-valued multiplication-accumulations can be performed without data alignment processing.

Figure 3:
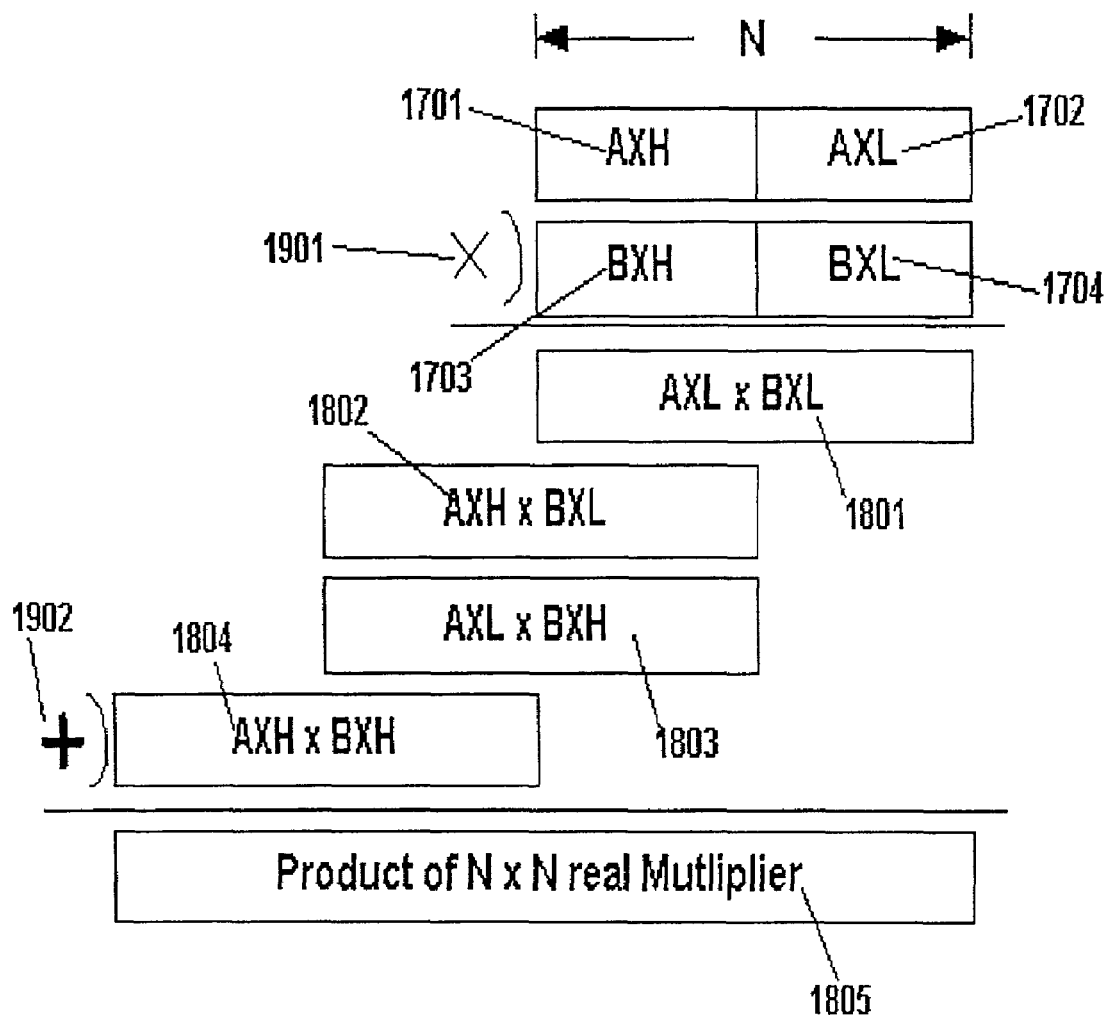
FIG. 3 illustrates N×N segmentation of a double-precision multiplier into single-precision.

$\frac{N}{2} \times \frac{N}{2}$ Single-Precision Complex-Valued Multiplier-and-Accumulator Subword parallel operation segmentation can be performed in the four double-precision real number multipliers in the double-precision complex-valued multiplier-and-accumulator configuration. In FIG. 1b, two products can be represented by AX and BX (X in the case when R or I represents real or imaginary number double-precision input). The two products are among those originally in N×N double-multiple precision multiplier (501, 502, 503, 504) shown in FIG. 1(a). Referring to FIG. 3, the AXH multiplicand most significant bits (1701), AXL multiplicand least significant bits (1702), BXH multiplier most significant bits (1703), and BXL multiplier least significant bits (1704) use $$\frac{N}{2} \times \frac{N}{2} \cdot SM0$$

single-precision multiplier (520)~SM3 single-precision multiplier (523) in FIG. 1(b) to compute the four secondary number products, that is, partial product 1 (1801), partial product 2 (1802), partial product 3 (1803) and partial product 4 (1804), shown in FIG. 3, by performing left-shift-addition, and then N×N double-precision products(1805) can be obtained. The N×N double-precision real number products (1805) can be used in the complex-valued operation or in real-valued multiplication-addition, and the corresponding hardware configuration is shown in FIG. 1(b). The four groups of products such as pp0, pp1, pp2 and pp3, can be used in single-precision multiplication-addition.

As shown in FIG. 4, with all of the 16 single-precision multipliers A0–A15 (701~716), through the left-shift-addition of four secondary number products, the N×N double-precision real number product is obtained. The purpose of this design is to obtain the accumulated products for both double-precision operation and single-precision complex-valued operations.

When performing single-precision complex-valued operations, the original most significant bits AXH (1701) and BXH (1703) shown in FIG. 3 are redefined as single-precision real numbers AXR and BXR respectively; and the original least significant bits AXL (1702) and BXL (1704) are redefined as single-precision imaginary numbers AXI and BXI respectively. The reformed configuration is shown in FIG. 4. Through the accumulation of products of real number and real number (AXR×BXR) and imaginary and imaginary (AXI×BXI), the real values of single-precision complex number accumulation can be obtained. Through accumulation of products of real number and imaginary number (AXR×BXI) and imaginary number and real number (AXI×BXR), the imaginary values of single-precision complex-valued accumulation can be obtained. Thus, the four N×N double-precision complex-valued multipliers in FIG. 1(a), e.g. C0 double-multiple precision multiplier (500)~C3 double-multiple precision multiplier (503), can reform the four parallel operating $$\frac{N}{2} \times \frac{N}{2}$$

single-precision complex-valued multiplier-and-accumulator. Within each multiplier, there is a group of complex-valued accumulators acc0~acc3 (901~904) (see FIG. 4).

Let us take the K-tap finite impulse response filter as an example. The operation program is the same as that of a finite impulse response filter in the mode of N×N double-precision real number FIR operation (see FIG. 2), except that the double-precision C (n) now is a combination of single-precision real number CR (n) and imaginary number CI (n); double-precision X (n) is a combination of single-precision real number XR (n) and imaginary number XI (n). Similarly, every $$\frac{K}{2}$$

cycles of operation, the output Y can be computed, and half of the accumulated product necessary for the previous output Y (n−1) (1002), as well as half of the accumulated product necessary for the next output Y (n+1), are obtained in each operation. Before each multiplication-accumulation iteration, the next output accumulation value acc3 (904) is moved to the previous output accumulation register acc2

(903), as shown by the arrow (1201), (1202). In this way, after each multiplication-accumulation iteration, acc0 (901) is added to acc1(902). Thus, the present output Y (n) (1001) is obtained, while acc2 (903) is the previous output Y (n−1) (1002). Similarly, the operation of unaligned data for even numbers to odd numbers can be omitted, and thus, on average, in each time period, four N×N single-precision complex-valued multiplication-accumulations can be performed.

$$\frac{N}{2} \times \frac{N}{2}$$ Single-Precision Complex-Valued Multiplier-and-Accumulator Single-Precision Real-Valued Multiplier-And-Accumulator When applying this configuration to the K-tap finite impulse response filter by performing the single-precision real number operation, the operation program can be illustrated in FIG. 5 (K=4). In every input, there are four continuous single-precision filter coefficients C (n) and four continuous single-precision input samples X (n). In each operation, sixteen single-precision multiplier products are generated at the same time. Observing all of the products of present time t=n (2202) and previous fourth time t=n−4 (2201), it can be seen that, among the sixteen products in each operation, four products can be accumulated to form the present output Y (n) (2301) indicated in the rectangle in FIG. 5, three products can be accumulated to form the previous output Y (n−1) (2302) indicated in the rhombus in FIG. 5, two products can be accumulated to form the previous second output Y(n−2) (2303) indicated in the ellipse in FIG. 5, and one product can be accumulated to form the previous third output Y(n−3) (2304) indicated in the trapezoid in FIG. 5. On the other hand, in the previous fourth time t=n−4 (2201) operation, there are also three products which can be accumulated to form its next output Y (n−3) (2304), two can be accumulated to form the following second output Y(n−2) (2303), and one can be accumulated to form the following third output Y(n−1) (2302). By this formula, the complex-valued multiplier-and-accumulator can be reformed into an $$\frac{N}{2} \times \frac{N}{2}$$

single-precision real-valued multiplication-and-accumulation through multiplexers, as shown in FIG. 6. Before each multiplication-accumulation iteration, the contents in the register acc12 (1413), which has accumulated the following output, is moved to the register acc11(1412), which has accumulated the previous third output, as shown by the arrow (1603); the contents in the register acc6 (1407), which has accumulated the following second output, is moved to the register acc4 (1405), which has accumulated the previous second output, as shown by the arrow (1601); and the contents in the register acc7 (1408), which has accumulated the following third output, is moved to the register acc5 (1406), which has accumulated the previous output, as shown by the arrow (1602). In this way, four outputs are generated after each multiplication-addition cycle: Y (n) (1501) comes from acc0 (1401) plus acc2 (1403); Y(n−1) (1502) comes from acc1 (1402) plus acc5 (1406); Y (n−2) (1503) is acc4 (1405); Y(n−3) (1504) is acc11 (1412). Because one cycle of multiplication-addition is performed at every four points of time, non-quadruple alignment operation can be omitted, and sixteen single-precision real-valued multiplications-accumulations can be performed at the same time in one operation.

The subword parallel complex-valued Multiplier-And-Accumulator of the invention can be operated in four different modes. For a typical multiplication-addition as in a K-tap finite impulse response filter, when it performs $$\frac{N}{2} \times \frac{N}{2}$$

single-precision real-valued multiplication-addition (see FIG. 7), the number of cycles for multiplication-addition can be reduced from K for a typical Multiplier-And-Accumulator to K/16.

This invention has a new type of configuration, fit for multiplication-accumulation of different data formats (including complex-(real-)valued and double-(single-)precision), and data alignment necessary for single-multiple precision operation. All connoisseurs can test and verify this concept and its reasonableness in different ways.

| | |
|---|---|
| 1 | AR real number buffer storage 1 |
| 2 | AI.Imaginary number buffer storage 1 |
| 3 | real number buffer storage 2 |
| 4 | Imaginary number buffer storage 2 |
| 101 | P0 product 1 |
| 102 | P1 product 2 |
| 103 | P2 product 3 |
| 104 | P3 product 4 |
| 201 | ACCR real number accumulation buffer storage |
| 202 | ACC-AUX auxiliary accumulation buffer storage |
| 203 | ACCI Imaginary number accumulation buffer storage |
| 301 | Y(n) output |
| 302 | Y(n − 1) output |
| 401 | M1 Accumulator |
| 402 | M2 Accumulator |
| 403 | M3 Accumulator |
| 404 | MUX1 multiplexer |
| 500 | C0 double-precision multiplier |
| 501 | C1 double-precision multiplier |
| 502 | C2 double-multiple precision multiplier |
| 503 | C3 double-precision multiplier |
| 504 | C4 double-precision multiplier |
| 510 | AX double-precision multiplier |
| 511 | BX double-precision multiplier |
| 512 | AXH double-precision multiplier high position |
| 513 | AXL double-precision multiplier low position |
| 514 | BXH double-precision multiplier high position |
| 515 | BXL double-precision multiplier low position |
| 520 | SM0 single-precision multiplier |
| 521 | SM1 single-precision multiplier |
| 522 | SM2 single-precision multiplier |
| 523 | SM3 single-precision multiplier |
| 524 | pp0 partial product |
| 525 | pp1 partial product |
| 526 | pp2 partial product |
| 527 | pp3 partial product |
| 530 | SH0 left-shift-$\frac{N}{2}$-bit unit |
| 531 | SH1 left-shift-$\frac{N}{2}$-bit unit |
| 532 | left-shift-N-bit unit |
| 533 | Wallet Tree Adder |
| 534 | AX × BX double-precision product |
| 601 | CR(k) filter coefficient real number part 1 |
| 602 | CI(k) filter coefficient imaginary number part 1 |

-continued

| | |
|---|---|
| 603 | CR(k + 1) filter coefficient real number part2 |
| 604 | CI(k + 1) filter coefficient imaginary number part 2 |
| 605 | XR(n − k) input real number part 1 |
| 606 | XI(n − k) input Imaginary number part 1 |
| 607 | XR(n − k − 1) input real number part 2 |
| 608 | XI(n − k − 1) input imaginary numbers part 2 |
| 701~716 | A0~A15 single-precision multiplier |
| 801~808 | B0~B7 accumulator |
| 901~904 | acc0~acc3 complex-valued accumulating register |
| 1001 | Y(n) output |
| 1002 | Y(−1) output |
| 1101~1104 | S0~S3 output adder |
| 1101~1104 | S0~S4 output adder |
| 1201 | real-number data movement |
| 1202 | imaginary-number data movement |
| 1301 | C(k) filter coefficient 1 |
| 1302 | C(k + 1) filter coefficient 2 |
| 1303 | C(k + 2) filter coefficient 3 |
| 1304 | C(k + 3) filter coefficient 4 |
| 1305 | X(n − k) input 1 |
| 1306 | X(n − k − 1) input 2 |
| 1307 | X(n − k − 2) input 3 |
| 1308 | X(n − k − 3) input 4 |
| 1401~1413 | acc0~acc12 accumulating register |
| 1501 | Y(n) output 1 |
| 1502 | Y(n − 1) output 2 |
| 1503 | Y(n − 2) output 3 |
| 1504 | Y(n − 3) output 4 |
| 1601~1603 | register data moving |
| 1701 | AXH multiplicand most significant bits |
| 1702 | AXL multiplicand least significant bits |
| 1703 | BXH multiplier most significant bits |
| 1704 | BXL multiplier least significant bits |
| 1801 | partial product 1 |
| 1802 | partial product 2 |
| 1803 | partial product 3 |
| 1804 | partial product 4 |
| 1901 | multiplication |
| 1902 | addition |
| 2001 | Multiplier-And-Accumulator input value |
| 2002 | product |
| 2003 | AR BR AI BI corresponding register value |
| 2004 | p0~p3 product |
| 2101 | accumulated product of present iteration |
| 2102 | accumulated product of previous iteration |
| 2103 | accumulated product of next iteration |
| 2201 | t = n − 4 previous fourth time |
| 2202 | t = n present time |
| 2301 | present output accumulated product |
| 2302 | previous output accumulated product |
| 2303 | previous two output accumulated product |
| 2304 | previous three output accumulated product |

What is claimed is:

1. A double-precision complex-valued multiplier-and-accumulator comprising:
a plurality of double-precision multipliers for receiving inputs and producing multipliers outputs;
a plurality of accumulators connected to the multipliers for accumulating the multiplier outputs to produce accumulator outputs; and
a plurality of subword-parallel single-precision multipliers segmented from said plurality of double-precision multipliers, which are capable of processing single-precision data in parallel and capable of producing multiplier outputs for use by said plurality of accumulators.

2. The double-precision complex-valued multiplier-and-accumulator according to claim 1, having a plurality of subword parallel single-precision multiplier-and-accumulators comprising:
a plurality of single-precision multipliers capable of producing first single-precision outputs used for single-precision accumulation;
a plurality of left-shift-N/2-bit shifters capable of processing the first single-precision outputs to produce second outputs;
and a wallet tree adder for adding the second outputs to produce double-precision multiplier outputs.

3. A double-precision complex-valued multiplier-and-accumulator for use in performing multiplication and addition of different data format, including complex-valued data, real valued data, double-precision data and single-precision data, comprising:
a plurality of double-precision multipliers for receiving inputs and producing multiplier outputs;
a plurality of real number accumulators and imaginary number accumulators for performing accumulation to produce accumulator outputs when double-precision real-valued multiplication and addition are being performed; and
an auxiliary register for accumulating an output together with the real number and imaginary number accumulators when the double-precision real valued multiplication-and-accumulation is performed.

4. The double-precision complex-valued accumulator according to claim 3, wherein said plurality of double-precision multipliers are segmented into a plurality of single-precision multipliers by means of a subword parallel operation, and a double precision product is obtained by use of left shift-addition.

5. The double-precision complex-valued accumulator according to claim 4, wherein products of the plurality of single-precision multipliers in each of the double-precision multipliers are combined with outputs of a group of complex-valued accumulators to achieve an operational effect of a plurality of parallel-operating single-precision complex-valued accumulators.

6. The double-precision complex-valued accumulator according to claim 4, wherein products of 16 single-precision multipliers in four double-precision multipliers are obtained through use of multiplexers, thereby obtaining an operational effect of 16 parallel-operating single-precision real-valued accumulators.

7. A multiplier-and-accumulator suitable for different data formats, including double-precision complex-valued signals, double-precision real-valued signals, single-precision complex-valued signals, and single-precision real-valued signals, and whose operation is being employed in a double precision complex-valued multiplier-and-accumulator, comprising:
means for receiving pairs of double-precision complex numbers as four double-precision value inputs; and
a plurality of double-precision real-valued multipliers for performing complex-valued multiplication;
wherein products derived from multiplication of real number data by real number data and products derived from multiplication of imaginary number data by imaginary number data together accumulate into a real-number register for complex-valued multiplication-and-accumulation; and
products derived from multiplication of real number data by imaginary number data, and products derived from multiplication of imaginary number data by real number data together accumulate into an imaginary number register for complex-valued multiplication-and-accumulation.

8. The multiplier-and-accumulator according to claim 7, wherein said receiving means, during double-precision real-valued multiplication-and-accumulation, receives two pairs of respectively continuous double-precision real-valued numbers for generating four double-precision value inputs for three accumulators registers, and wherein four double-precision multipliers perform real-valued and multiplications; and operations are performed through multiplexing obtaining two output values through an iteration of double-precision real-valued multiply-and-accumulate operation.

9. The multiplier-and-accumulator according to claim 7, wherein complex-valued multiplication is performed so as to obtain a present output accumulated product, a previous output accumulated product, and a next output accumulated product; and wherein a following output accumulated product is moved to a previous output accumulation register before a multiplication-addition iteration.

10. The multiplier-and-accumulator according to claim 7, wherein a multiplication-addition cycling operation is performed with respect to two pairs of input signals without performance of data alignment processing.

11. The multiplier-and-accumulator according to claim 7, wherein the double-precision real-valued multiplier has a most significant multiplier and a least significant multiplier producing a most significant single-precision value and a least significant single-precision value respectively; and wherein a double-precision product is obtained when the most significant multiplier and the least significant multiplier perform a single precision real-valued multiplication, and products are added together by means of a left-shift addition process.

12. The multiplier-and-accumulator according to claim 7, wherein a single-precision complex-valued multiplication-addition operation is employed comprising the steps of:

setting at least one of a most significant value and one of a least significant value as at least a real number and an imaginary number respectively in single-precision complex numbers;

accumulating, into an accumulated real number portion, of products derived from multiplication of most-significant-bits by most significant bits, and products derived from multiplication of least significant-bits by least significant-bits; and accumulating, into an accumulated imaginary number portion, of products derived from multiplication of most-significant-bits by least significant-bits and products derived from least-significant-bits by most significant-bits.

13. The multiplier-and-accumulator according to claim 7, wherein a pair of complex-valued accumulators is provided in four groups of single-precision complex-valued multiplier-and-accumulators, thereby forming four groups of parallel-operating single-precision complex-valued multiplier-and-accumulators; and wherein two continuous single-precision complex numbers are inputted as four double-precision values into four single-precision complex-valued accumulators.

14. The multiplier-and-accumulator according to claim 7, wherein, during single-precision complex-valued multiplication-and-accumulation operations, two multipliers compute accumulated products for present output value stored in two present accumulation registers acc0 and acc1, one multiplier computes accumulated products for previous output value stored in a previous accumulation register acc2, and one multiplier one multiplier computes accumulated products for next output value stored in a next accumulation register acc3;

wherein, through multiplexing, the present output accumulated value and the previous output accumulated value are received and processed simultaneously;

wherein, before a multiplication-addition iteration, the next output accumulated product is moved into an output accumulation register;

and wherein, one iteration of multiplication-addition is performed with respect to two pairs of input signals without performance of data alignment processing.

15. The multiplier-and-accumulator according to claim 7, wherein a single-precision complex-valued multiplication-addition operation is employed comprising the steps of:

inputting four pairs of respectively continuous single-precision real numbers as four single precision values to sixteen single-precision real-valued multipliers;

computing a present output accumulated product, a previous output accumulated product, a second previous output accumulated product, a third previous output accumulated product, a next output accumulated product, a second following accumulated product, and a third following accumulated product;

obtaining, through multiplexing, four groups of output values in one time period; and performing a single-multiplication-addition cycling operation with respect to four pairs of input signals during every four periods of time without performing alignment processing.

* * * * *